US011846713B2

(12) United States Patent
Marmet

(10) Patent No.: US 11,846,713 B2
(45) Date of Patent: Dec. 19, 2023

(54) SELF-ASSISTED FAST ACQUISITION AND FIRST FIX FOR A STANDALONE GNSS RECEIVER

(71) Applicant: CENTRE NATIONAL D'ETUDES SPATIALES, Paris (FR)

(72) Inventor: François-Xavier Marmet, Muret (FR)

(73) Assignee: CENTRE NATIONAL D'ETUDES SPATIALES, Paris (FR)

(*) Notice: Subject to any disclaimer, the term of this patent is extended or adjusted under 35 U.S.C. 154(b) by 778 days.

(21) Appl. No.: 16/964,033

(22) PCT Filed: Jan. 17, 2019

(86) PCT No.: PCT/EP2019/051187
§ 371 (c)(1),
(2) Date: Jul. 22, 2020

(87) PCT Pub. No.: WO2019/145220
PCT Pub. Date: Aug. 1, 2019

(65) Prior Publication Data
US 2021/0048537 A1 Feb. 18, 2021

(30) Foreign Application Priority Data
Jan. 25, 2018 (EP) .................................. 18305058

(51) Int. Cl.
G01S 19/24 (2010.01)
G01S 19/25 (2010.01)
(52) U.S. Cl.
CPC .......... G01S 19/243 (2013.01); G01S 19/252 (2013.01); G01S 19/254 (2013.01); G01S 19/256 (2013.01)

(58) Field of Classification Search
CPC .... G01S 19/243; G01S 19/252; G01S 19/254; G01S 19/256; G01S 19/24
See application file for complete search history.

(56) References Cited

U.S. PATENT DOCUMENTS 7,548,200 B2     6/2009  Garin
11,119,221 B2*   9/2021  Cohen ..................... G01S 19/06
2011/0234456 A1  9/2011  McBurney et al.
(Continued)

FOREIGN PATENT DOCUMENTS

EP    2 530 488 A1    12/2012

OTHER PUBLICATIONS

Othieno, "Combined Doppler Time-free Positioning for Low Dynamics GNSS Receivers", Thesis in the Department of Electrical and Computer Engineering, Concordia University Montreal, Quebec, Canada, Apr. 2012.
(Continued)

Primary Examiner — Vineeta S Panwalkar
(74) Attorney, Agent, or Firm — Burris Law, PLLC

(57) ABSTRACT

A Global Navigation Satellite System (GNSS) positioning techniques is provided. A method to improve the time required to compute a position measurement in a GNSS receiver, and the time required to make this position measurement accurate is also provided. The method comprises computing a snapshot PVT (Position Velocity and Time) measurement, and use it to reduce the time required to acquire new signals to compute a conventional PVT measurement. A receiver implementing the method is further provided.

14 Claims, 8 Drawing Sheets

(56) References Cited

U.S. PATENT DOCUMENTS

| | | | |
|---|---|---|---|
| 2012/0218142 A1* | 8/2012 | Leclercq | G01S 19/34 |
| | | | 342/357.3 |
| 2015/0036724 A1 | 2/2015 | Van Dierendonck et al. | |
| 2017/0070971 A1* | 3/2017 | Wietfeldt | H04W 24/10 |

OTHER PUBLICATIONS

Sirola, et al., "GPS positioning can be computed without the navigation data", Proceedings of the ION GPS 2002, pp. 2741-2744.

Sirola, et al., "Solving GPS Time and Position without Navigation Data", Proceedings of the ENC-GNSS 2002.

Ziglioli, et al., "Extending goGPS for Snapshot positioning", Geomatics workbooks n°12, FOSS4G Europe Como 2015, pp. 383-394.

Closas, et al., "Integrity Measures in Direct-positioning", Proceedings of the 30th International Technical Meeting of the Satellite Division of The Institute of Navigation (ION GNSS+ 2017), pp. 2428-2435, Sep. 29, 2017.

Closas, et al., "Evaluation of GNSS Direct Position Estimation in Realistic Multipath Channels", Proceedings of the 28th International Technical Meeting of the Satellite Division of The Institute of Navigation (ION GNSS+ 2015), pp. 3693-3701, Sep. 18, 2015.

* cited by examiner

SELF-ASSISTED FAST ACQUISITION AND FIRST FIX FOR A STANDALONE GNSS RECEIVER

CROSS-REFERENCE TO RELATED APPLICATIONS

This application is a National Stage of International patent application PCT/EP2019/051187, filed on Jan. 17, 2019, which claims priority to foreign European patent application No. EP 18305058.2, filed on Jan. 25, 2018, the disclosures of which are incorporated by reference in their entirety.

FIELD OF THE INVENTION

The present invention generally relates to Global Navigation Satellite System (GNSS) positioning techniques. More particularly, it relates to a method to improve the time required to compute a position measurement in a GNSS receiver, and the time required to make this position measurement accurate. It also relates to a receiver implementing the method.

BACKGROUND PRIOR ART

GNSS positioning techniques have been created and used for years now. Two GNSS systems have been fully deployed for a number of years (the US Global Positioning System (GPS™) and the Russian GLONASS™) and two more are under deployment (the Chinese Beidou™ Navigation Satellite System and the European Galileo™ system). Each of these systems offers different types of services by transmitting different GNSS signals over different carrier frequencies, for instance to provide various levels of robustness, precision or security, and/or to limit the positioning to a set of authorised users.

GNSS systems usually operate as follows: a fleet of GNSS satellites revolving around the Earth in very precisely determined orbits transmit positioning signals, which are used by GNSS receivers to determine the transmission delay associated to the positioning signals. Once multiplied by the speed of light, it provides the distances from the receiver to each of the satellites in view, which are known as "pseudo-ranges". When four pseudo-ranges are calculated, knowing the satellites positions, the receiver can solve a system of equations having four unknown: the 3D coordinates of the receiver (x, y, z) and the bias $\tau$ between the GNSS system clock and the receiver system clock. Such a solution is known as a PVT (Position, Velocity and Time) measurement.

To compute the pseudo-range measurements, the receiver needs to know the time at which the message was sent and the time at which it is received. To compute the PVT measurement, the receiver needs to know the satellites' positions at that time. To this end, the GNSS positioning signals transmitted are made of a navigation message modulated by a spreading sequence, generally a pseudo random noise (PN) sequence, further modulated using a BPSK (Binary Phase Shift Keying), BOC (Binary Offset Carrier), TMBOC (Time-Multiplexed BOC), CBOC (Composite BOC), altBOC (alternative BOC) or similar modulation and shifted to a carrier frequency. The navigation message is transmitted at a slow bit rate (usually 50 bits/sec), and comprises various information. Among these time information are a "Time of Week" field (TOW), indicating the time at which a specific part of the message is transmitted, ephemeris fields, which are information related to the position of the satellite transmitting the positioning signal, and almanac fields, which are information about the orbit of each satellite of the constellation. For instance, for GPS L1C/A signals, also known as the "legacy" GPS signal and where C/A stands for Coarse-Acquisition, the navigation message is transmitted over a period of 12.5 minutes, which can be divided in 25 frames of 30 seconds, each frame being subdivided in 5 subframes of 6 seconds. The TOW field is transmitted in each subframe, the ephemeris data are transmitted within two subframes of a same frame, and part of the almanac data are transmitted within two other subframes of the same frame. The whole almanac information is distributed over the entire 12.5 minutes period.

Each satellite is associated to a dedicated PN sequence, so that the signals transmitted from a specific satellite, over a carrier frequency common to all the transmitters, may be differentiated by receivers by way of correlations. Use of spreading also makes possible to process signals received at low signal over noise ratios (SNR) and helps performing an accurate measurement of the reception time. In GPS L1C/A, PN sequences are 1023 bits longs, transmitted at a bitrate of 1.023 MHz, which is 1 ms per code period.

In order to compute a PVT measurement, a receiver needs to:

acquire the signals, that is to say, for a specific satellite, detecting the presence of a signal broadcasted by processing correlations between the received signal and local replicas of positioning signals generated using the PN sequence associated to the specific satellite, and synchronising the receiver with the signal. To this end, the correlation is performed considering a whole grid of Doppler frequency shifts and code phase delays. The code phase delay and Doppler frequency shift associated to the maximum value of the correlation, when it exceeds a threshold to avoid false alarms, is memorized. It is a coarse synchronization position that makes the receiver capable to establish a time/frequency search region for each visible satellite, in order to reduce the computational load required by the subsequent processing, and track, for each positioning signal acquired, this synchronisation position in order to increase its accuracy and to follow the movement between the corresponding satellite and the receiver and the clock drifts. Thus, the navigation message can be decoded, to retrieve the information it contains, such as the signal transmission time (TOW field), the position of the satellites (ephemeris) and/or the almanacs.

Considering the signal transmission time provided by the TOW field, the signal reception time (code phase delay), and the ephemeris, the receiver is capable of computing a transmission time, and therefore a distance between the satellite broadcasting the signal and the receiver. This distance is called a pseudo-range as it is inaccurate due to the bias $\tau$ between the GNSS system time and the local time at the receiver.

When at least four pseudo-ranges are calculated, the GNSS receiver can compute a PVT measurement, solving a system of four equations (provided by the four pseudo-ranges) and four unknown (the 3D coordinates x, y, z and the bias $\tau$). When additional pseudo-ranges are acquired from additional satellites, they are used along with the previous one to increase the measurement's accuracy.

Thus, in practice, the time required to obtain a valid PVT measurement, known as the Time To First Fix (TTFF), cannot be lower than the time required to retrieve the ephemeris data, that is to say from 18 seconds (3 subframes)

to 48 seconds (8 subframes) in GPS L1C/A. In practice, when the propagation conditions are not optimal, the SNR level decreases and the decoding of the navigation message can be improved by averaging multiple PN frames. As a result, the time required to acquire a positioning signal and to retrieve the navigation message it carries increases significantly (up to tens of minutes).

The values indicated above correspond to GPS L1C/A signals, which are known to provide short TTFF. Indeed, they are easy to acquire, so the acquisition time that contributes to TTFF on top of the navigation data retrieval time is quite short. Other signals, and in particular signals transmitted in new generation GNSS systems as for instance Galileo signals or new generation GPS signals, are more complicated to acquire and their TTFF is therefore longer.

Obviously, to provide a high quality of service to users of GNSS systems, in particular those using Location Based Services (LBS) which intend to provide to a user a content that is relevant to its position, augmented reality applications, navigation systems, and many others, the time to first fix must be as low as possible. There is therefore a need for conceiving methods to be implemented in GNSS receivers that significantly reduce the time required to compute PVT measurements.

In order to reduce the TTFF, it is currently known to distinguish between several status of GNSS receiver starting an acquisition:
- cold start: the receiver has no information or only inaccurate information about its position and the GNSS system time, or has a bad visibility to any of the GNSS system satellites. As such, the receiver must systematically search for all possible satellites in view, and the Time To First Fix duration is long;
- warm start: the receiver has inaccurate information about the current time (typically within 20 seconds), its position (typically within 100 kilometers), and has valid almanac data. Ephemerides data must be acquired to perform the positioning measurement but the acquisition time may be reduced by performing the signal acquisition over satellites that are known to be in view of the receiver, and by reducing the number of Doppler and code phase hypothesis explored, as the movement of the satellites is known from the almanac data. Theoretically, Time To First Fix in warm start may last only a few tens of seconds. As the almanac data have a typical lifetime of one week, warm start typically occur when the receiver has already computed a position in the last week, and when the position of the receiver has not moved too much since the last PVT measurement was computed;
- hot start: the receiver has valid position and time information, and knows the ephemerides data. The signal acquisition time can be reduced significantly, focusing first on signal acquisition/re-acquisition over satellites that are in line of sight and reducing the number of Doppler and code phase hypothesis explored. The PVT measurement may be performed without again retrieving the clock and ephemeris information carried by the navigation message, only the decoding of a subframe preamble is required. Theoretically, Time To First Fix in Hot Start may last a few seconds. As ephemerides have a typical lifetime of four hours, hot start happens when the receiver already computed a position in the last hours.

The disclosure focuses on the time required to perform a fast standalone start in a GNSS receiver. Using the vocabulary previously given to describe the status of a GNSS receiver starting an acquisition, this means a GNSS receiver in-between cold and warm start statuses, having very coarse information about its position and the position of the satellites, and with no access to an auxiliary telecommunication network.

Solutions are known from the prior art to improve the TTFF. Three of them are presented below. The first solution consists in using powerful acquisition engines, in order to parallelize the signal acquisition. Thus, the acquisition phase duration is reduced as it is performed over a significant number of positioning signals, parallelizing the Doppler hypothesis searched, and therefore maximising the probability to quickly acquire signals. However, this solution increases the power consumption of the receiver (i.e. lower autonomy), implies more complex, more expensive receiver and does not improve the acquisition speed related to situations where the signal has to be averaged over multiple frames, due to poor propagation conditions.

The second solution consists in performing first a positioning measurement over GNSS signals known to provide short TTFF, as for instance the GPS L1C/A signals, and then switching to a warm start or hot start over the GNSS signals of interest, using the position and time computed previously, and when relevant, ephemerides data computed over the GPS L1C/A signals. This technique reduces the acquisition time when considering a positioning based on signals which are known to provide long TTFF. However, it is complex and expensive as it requires implementing an additional GNSS receiving chain (potentially including an additional radio chain and antenna) in the receiver, and additional processing resources. In addition, this solution is not suitable for users willing to be independent from a specific signal and/or constellation for instance, and/or for users who cannot use specific frequency bands, like the L1 band for instance, because of interference issues.

The third solution is known as A-GNSS (Assisted-GNSS). It consists in providing to the GNSS receiver accurate information about the system time, full almanac and ephemerides data, plus inaccurate information about its position, through an auxiliary telecommunication network, as for instance a cellular or Wi-Fi™ (Wireless Fidelity) network. This way, GNSS receiver may directly perform a hot or quasi-hot start. This solution provides very fast TTFF but is not adapted to standalone GNSS receivers, as it requires some external connectivity, and obviously does not work when this connectivity is not available.

There is therefore a need to find a solution to improve the TTFF in a GNSS receiver that is cost efficient, that works for all GNSS constellations and signals, that is standalone, and advantageously, that is purely software so that it can be retrofitted to existing receivers through a firmware update only.

There exist GNSS receivers, known as "snapshot receivers", that aim at providing low accuracy positioning information even at low signal over noise ratios with a low energy consumption. In these receivers, a small time interval of signal (typically hundreds of milliseconds or less) is memorised. Signal acquisition is performed over this small time interval, and the synchronisation positions found used along with satellite almanacs (or navigation data of similar accuracy and purpose) to compute ambiguous pseudo-ranges, that is to say pseudo-ranges having still an unknown variable relative to the distance with the satellite. That way, snapshot receivers do not require the decoding of the TOW field. A snapshot PVT measurement is computed by solving an equation system having five unknowns instead of four: the 3D coordinates of the receiver (x, y, z), the bias $\tau$ between the GNSS system clock and the receiver clock, and an additional unknown, being the number Ni of entire code periods elapsed between the sending and receiving of the GNSS signal. This unknown is required since the TOW field is not decoded and more generally since no actual tracking is performed.

Solving the system of five equations with five unknowns may use a significant computational load. For this reason, it may be in some solution accepted to take some assumptions to reduce the processing power, by using very coarse information about the GNSS system time and the position of the receiver (typically ±1000 km and ±1 minute). Thus, for instance, satellites which are known to be positioned under the position of the horizon may be not considered during the acquisition phase.

Snapshot receivers only require small time interval of signal to deliver almost immediately a low accuracy PVT measurement, as there is no need to track the signal and to decode the navigation message. The snapshot PVT measurement can therefore be processed very quickly, with a low consumption, even at low signal over noise ratios. Due to their limited accuracy but low power consumption, snapshot PVT receivers are usually used in long term non critical applications, where PVT measurements are computed far apart in time, but are too imprecise to be used in most applications.

An abundant literature addresses the subject of snapshot positioning. Among this literature are US patent application US 2015/0036724 A1, Van Dierendonck et al.; "GPS positioning can be computed without the navigation data", N. Sirola, J. Syrjarinne, Proceedings of the ION GPS 2002, pages 2741-2744; "Extending goGPS for Snapshot positioning", E. Ziglioli, E. Realini, Geomatics workbooks n° 12, FOSS4G Europe Como 2015; "solving GPS Time and Position without Navigation Data", N. Sirola, P. Syrjarinne, Proceedings of the ENC-GNSS 2002.

SUMMARY OF THE INVENTION

The current disclosure's purpose is to provide a device and method for computing a PVT measurement with a reduce Time To First Fix, with a high accuracy and a convergence time improved compared to the prior art. The solution disclosed may be implemented in a standalone GNSS receiver having coarse information about its position and the satellites positions. This information might not be sufficient to perform a hot or warm start, that is to say without requiring information retrieved from an external communication network, and with a limited complexity. The GNSS receiver according to the disclosure is advantageously capable to perform both a snapshot positioning and a conventional GNSS positioning, using the results of the snapshot positioning to quickly deliver a low accurate information about its position, and using this low accurate position to fasten the signal acquisition and tracking done by the conventional GNSS positioning, typically by being in a so called warm start situation as described previously. Thus, the overall TTFF is reduced, and the positioning measurement reaches more quickly its nominal accuracy than in conventional GNSS receivers. The device according to the disclosure may indifferently be a GNSS receiver, or a programmable device embedded in a GNSS receiver.

To this effect is disclosed a device configured to calculate a first Position, Velocity and Time (PVT) measurement from GNSS signals broadcasted by a plurality of transmitters of a GNSS constellation.

The device comprises:
at least a first acquisition engine, configured to determine a code phase delay and a Doppler frequency shift value from a plurality of digitized GNSS signals respectively, by exploring a grid of possible code phase delays and Doppler frequency shift values for each digitized GNSS signal considered,
a tracking engine, configured to retrieve clock and ephemeris data from navigation messages comprised into the digitized GNSS signals,
a first calculation device, configured to compute said first PVT measurement from code phase delays determined by the first acquisition engine and clock and ephemeris data retrieved by the tracking engine for the corresponding GNSS signals, and
a second calculation device, configured to compute a second, low accuracy, PVT measurement from code phase delays determined by an acquisition engine, a coarse position of the receiver, a coarse time and coarse ephemerides.

The second calculation device performs the second PVT measurement through a snapshot PVT calculation.

The device according to the disclosure is configured to adapt the size of the grid of possible code phase delays and Doppler frequency shift values explored by the first acquisition engine using the value of the second PVT measurement computed by the second calculation device.

In particular, the position and velocity information provided by the second PVT measurement may be used along with the coarse ephemerides to reduce the number of Doppler frequency shift values of the grid explored by the first acquisition engine.

Alternately or in addition, the position measurement and the time measurement of the second PVT measurement may be used along with the coarse ephemerides, to reduce the number of possible code phase delays of the grid explored by the first acquisition engine.

In the device according to one embodiment, the first acquisition engine is configured to perform correlations between the digitized GNSS signals and local replicas of said GNSS signals generated considering code phase delays and Doppler frequency shift values from said grid of possible code phase delays and Doppler frequency shift values.

The device according to one embodiment is configured to use the second position measurement and the coarse ephemerides to select the GNSS signals considered in priority by the first acquisition engine.

Advantageously, when the first PVT measurement is available, the size of the grid of possible code phase delays and Doppler frequency shift values explored by the first acquisition engine may be adapted, using the value of the PVT measurement computed by the first calculation device.

In the device according to one embodiment, the tracking engine tracks the variations of code phase delay and Doppler frequency shift determined by the first acquisition engine.

In the device according to one embodiment, the first calculation device is configured to compute pseudo-range measurements from code phase delays determined by the first acquisition engine and the clock and ephemeris data retrieved by the tracking engine from the corresponding signals, and to use said pseudo-range measurements to compute said first PVT measurement. Advantageously, at least three pseudo-range measurements may be used for this purpose. In practice, four measurements are required, but one or more may be replaced by any equipment providing some information about the position of the receiver, for instance an altimeter.

In the device according to some embodiment, the second calculation device is configured to compute pseudo-range residual measurements from at least four code phase delays. In practice, five measurements are required, but one or more may be replaced by inputs from any equipment providing some information about the position of the receiver, as for instance an altimeter.

In the device according to another embodiment, the coarse position of the receiver used by the second calculation device is calculated through a Doppler positioning.

In the device according to one embodiment, the coarse ephemerides are Long Term Ephemeris.

Advantageously, the device according to one embodiment comprises a calculation device configured to compute Long Term Ephemeris from the clock and ephemeris data retrieved by the tracking engine.

Is also disclosed a GNSS receiver, comprising:
an antenna and a RF chain, to receive and digitize GNSS signals, and
a device according to one of the embodiments described previously.

Is also disclosed a method for calculating a first PVT measurement in a device from GNSS signals broadcasted by a plurality of transmitters of a GNSS constellation. The method comprises the steps of:
a. receiving and digitizing said GNSS signals through an antenna and a RF chain,
b. determining a code phase delay and a Doppler frequency shift value associated to the digitized GNSS signals received respectively by exploring a grid of possible code phase delays and Doppler frequency shift values,
c. computing a second PVT measurement from code phase delays determined in step b, a coarse position of the receiver, a coarse time and coarse ephemerides,
d. using the second PVT measurement, and in particular the position and velocity measurements of the second PVT measurement associated with the coarse ephemerides, to adapt the size of the grid of possible code phase delays and Doppler frequency shift values explored in step b,
e. retrieving clock and ephemeris data from navigation messages comprised into the GNSS signals, and
f. computing said first PVT measurement from the code phase delays determined in step b, and the clock and ephemeris data retrieved in step e.

BRIEF DESCRIPTION OF THE DRAWINGS

The solution disclosed will be better understood and its various features and advantages will emerge from the following description of a number of exemplary embodiments provided for illustration purposes and its appended figures in which.

The examples disclosed in this specification are only illustrative of some embodiments of the disclosure that may be merged when appropriate.

DETAILED DESCRIPTION OF THE INVENTION

Figure 1:
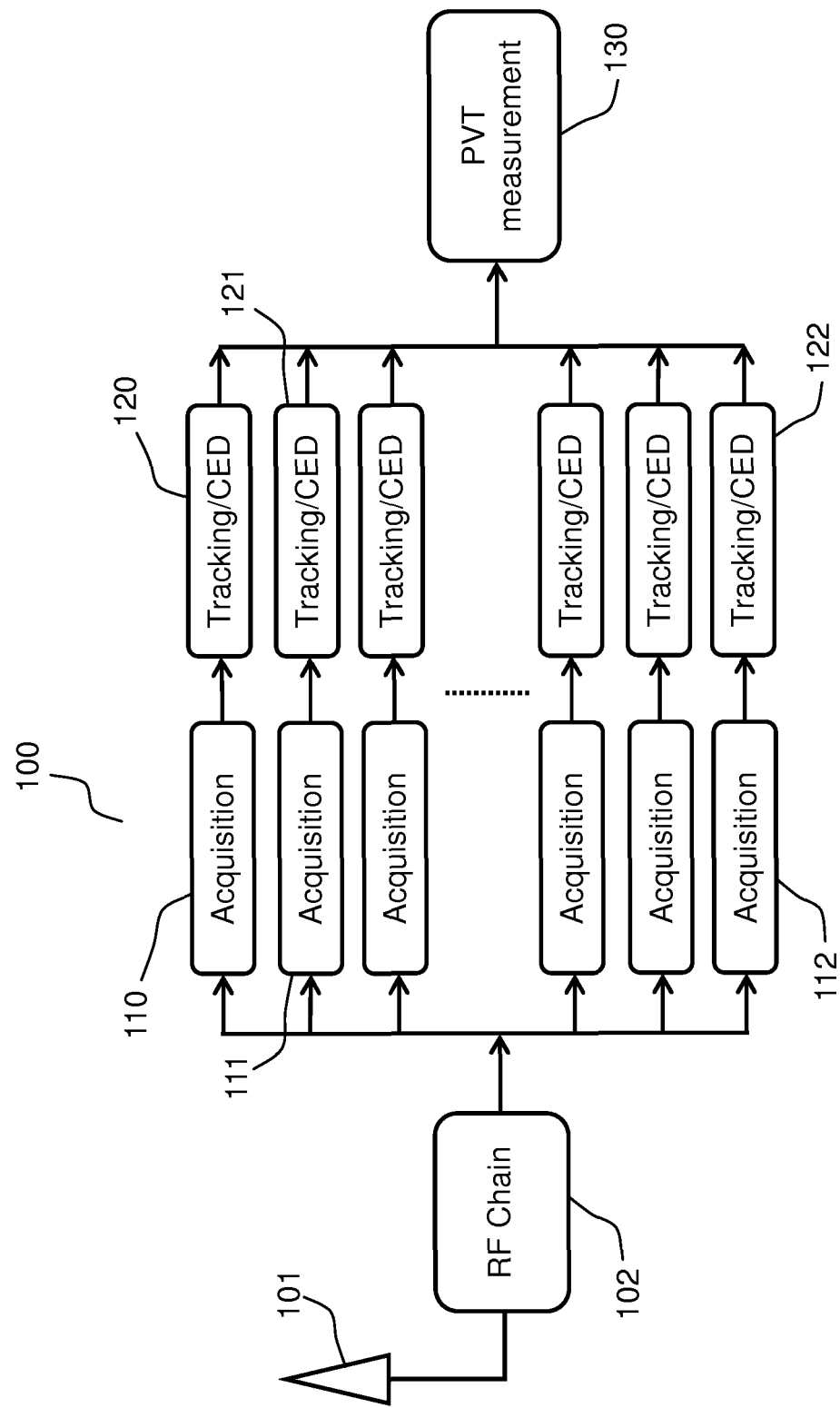
FIG. 1 schematically illustrates the structure of a conventional GNSS receiver.

FIG. 1 schematically illustrates the structure of a conventional GNSS receiver. In FIG. 1, receiver 100 comprises an antenna 101, which receives over a carrier frequency a GNSS signal being the sum of all the positioning signals transmitted from the GNSS satellites in view of the receiver. The receiver comprises a RF (acronym for Radio Frequency) chain 102 for processing the signal received on the antenna. This RF chain performs the well-known processing of RF front end, which includes filtering the received signal, down-convert it to baseband or intermediate frequency, adjust its power level, and digitize it.

The digitized signal is processed in parallel by a set of signal processing channels. Typically, GNSS receivers comprise 24 or more of those, the number of channels being an implementation issue resulting of a compromise between processing power and power consumption, which is to be done during the design of the receiver taking into account its capacities and the conditions in which it is intended to operate. Various signal processing channels (110, 111, 112, . . . ) are in charge of acquiring GNSS signals. For each processing channel, the acquisition consists in correlating the signal received on the antenna with locally generated replicas of the expected signal. The correlation is done for each possible code position, and for a range of Doppler bins, corresponding to hypothesis made about Doppler frequency values, the Doppler frequency resulting from the relative movement between the satellites and the receiver. The processing channels parallelize the computational load by processing different pseudo random sequences, to acquire in parallel positioning signals transmitted from different satellites, and/or different code phase delay/Doppler frequency bins. Satellites are considered as "acquired" when a correlation peak that exceeds a predefined threshold is detected. The receiver then enters into a tracking phase of this signal (120, 121, 122), where the position of the correlation peak is followed in order to compensate for clock shifts and relative movement between the satellites and the receiver. In the tracking phase, the number of time/frequency bins for which the correlation is performed is reduced to a limited set of bins around the correlation position, in order to improve energy consumption. For this reason, the computational load mainly comes from the acquisition phase. During the tracking of the correlation peak, the receiver demodulates and decodes the navigation message, in order to retrieve the Clock and Ephemeris Data (CED) it contains, that is to say the TOW and ephemeris fields of the navigation message. When those CED are acquired, the receiver uses it along with the reception time to compute a pseudo-range measurement, which is representative of a distance between the receiver and the satellite tracked. As the time reference of the receiver provided by its clock does not necessarily perfectly match the reference time of the GNSS constellation of satellites, a bias in the propagation time measurements is prone to appear, which biases the range measurements. This is why said measurements are called pseudo-ranges, and why the equation system to solve to determine a position comprises a fourth unknown, besides of the three unknowns for position, which is the bias from the receiver clock to the reference system clock, that has to be determined. When at least four pseudo-range measurements are available to the receiver, a PVT measurement can be calculated (130). Depending on the intended applications, one or more from this position, velocity and time may be considered by the GNSS receiver.

If no correlation peak is detected in a processing channel, the acquisition may be performed over another satellite by using a different PN code, or the output of the correlators may be integrated over longer periods in order to improve the signal over noise ratio of the signal. Theoretically, in GPS L1C/A, a 95% probability of acquisition is guaranteed at a carrier over noise of 27 dBHz, when the signal is integrated over 126 PN code periods, i.e. 126 ms.

The time required for retrieving the clock and ephemeris data is related to the structure of the navigation message. When the signal has to be integrated over multiple code periods to be received, the time required to decode the navigation message is increased in the same proportions.

Figure 2:
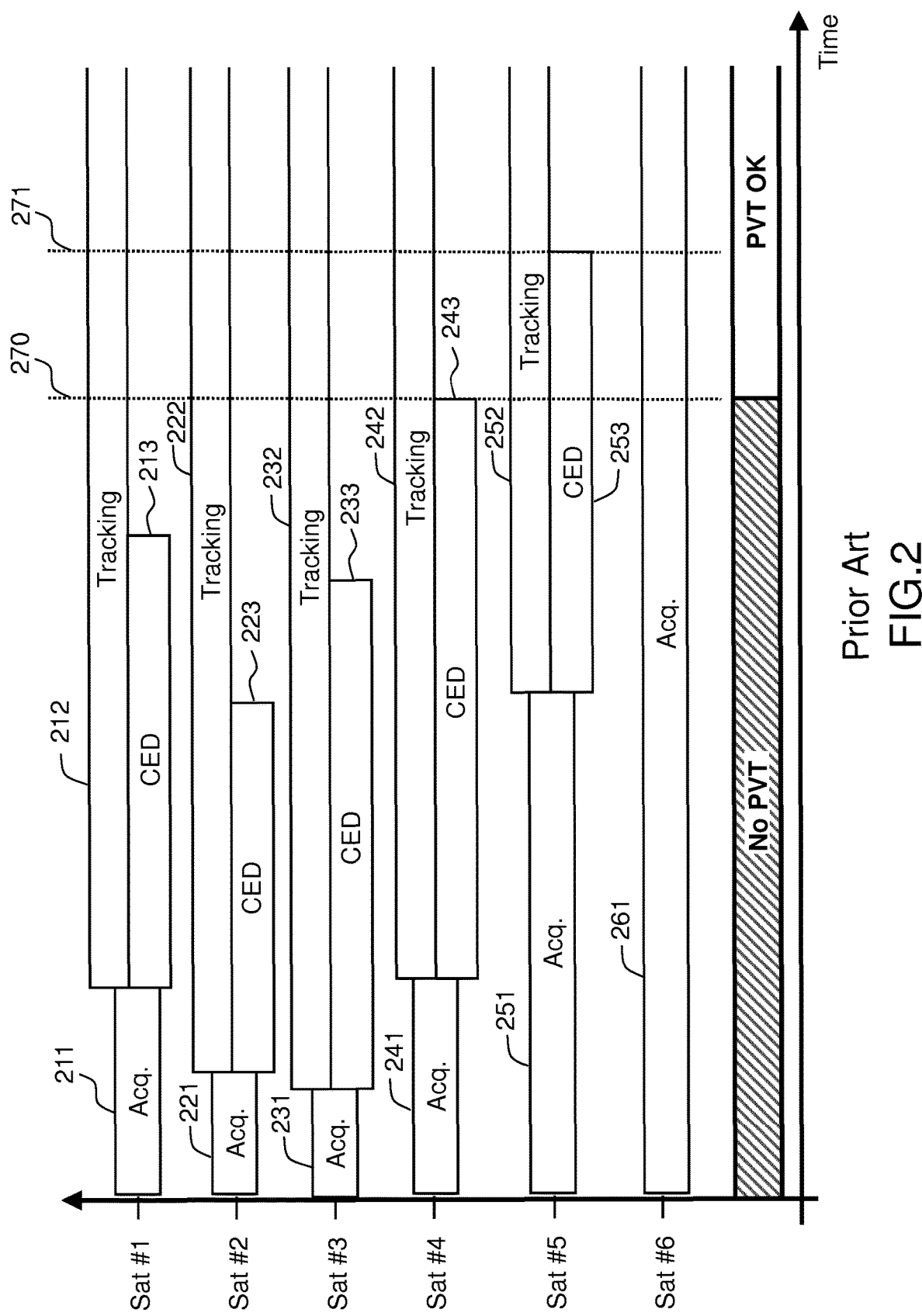
FIG. 2 illustrates a timeline for computing a PVT measurement in a conventional GNSS receiver.

FIG. 2 illustrates a timeline for computing a PVT measurement in a conventional GNSS receiver. FIG. 2, as well as the other figures of the document, is given for illustration purposes only. The durations used into the figures intend to illustrate the way the solution disclosed operates and the benefits that a receiver gets by implementing it. Each initialization of a GNSS receiver is unique as the propagation environment, the respective position of the receiver and satellites, the characteristics of the GNSS signals, and the receiver's implementation may vary in an infinite number of scenarios. The figures therefore do not limit the scope of the disclosure, which is limited only by the scope of its claims.

In FIG. 2, assumption is made that the receiver comprises six processing channels processing data in parallel. At the receiver start, in cold start conditions, the receiver has no information about the position of the satellites of the constellation. Each processing channel attempts to acquire a synchronization position over a different satellite, using a specific PN code to correlate the signal received.

Signals transmitted from satellites #2 and #3 benefit of excellent propagation conditions, and the acquisition time 221 and 231 is very short (typically, a few milliseconds). Once the acquisition phase is achieved, these processing channels track the position of the synchronization peak (222, 232), and decode the navigation message in order to retrieve the CED (223, 233), which comprises the TOW field and the clock and ephemeris data required to compute the associated pseudo-range measurement.

Signals transmitted from satellites #1 and #4 have less advantageous propagation conditions. The signal has to be integrated over few periods of code to perform the acquisition phase (211, 241), and/or the initial position in the grid of time/Doppler shifts is located far away from the effective position. However, this acquisition phase remains fast, and the processing channels then proceed with the tracking of the signals (212, 242) to retrieve the CED (213, 243). Using this information, the corresponding pseudo-ranges may be calculated respectively at the end of periods 213 and 243.

Until time 270, less than four pseudo-range measurements are available to the receiver. Therefore, no PVT measurement can be computed. At time 270, four pseudo-ranges are available, which makes it possible to compute a PVT measurement.

Signal transmitted from satellite #5 has worse propagation conditions, for instance because of a low elevation angle, low signal over noise ratio, multipath reflections of the signal, bad direction of the antenna, and/or need to explore the whole time/Doppler shift grid to find the correlation peak. Therefore, the time required to perform the acquisition phase (251) is rather high, but the acquisition is successful after integration of the signal over several code periods. The tracking phase (252) and retrieval of the CED (253) can be performed. At time 271, a fifth pseudo-range is available to the receiver, which is used by the receiver along with the four other pseudo-ranges to improve the quality of the PVT measurement.

Signal transmitted from satellite #6 is not available, for instance because the satellite is not in view of the receiver, multipath reflections are too important, or signal over noise ratio is too low to acquire a correlation peak. Thus, the CED cannot be retrieved, and no pseudo-range measurement can be achieved from this processing channel. Another PN code sequence will therefore be searched by this processing channel once a predetermined number of attempts fail, or when the receiver is in capacity, knowing its position and the position of the satellite from the almanac, to determine that a satellite which is not currently tracked may benefit of better propagation conditions.

The acquisition phase may take some time, depending on multiple factors such as the propagation environment (signal over noise ratio, multipath reflections), the size of the code phase delay and Doppler frequency grid that has to be explored, and the initial position in this grid with respect to the effective time and Doppler shifts. For instance, in GPS L1C/A, the length of the PN code is 1023 chips long. Typical Doppler shift tested for terrestrial applications are in the range of ±5 kHz, and GNSS receivers usually implement 50 Doppler bins to browse the entire interval with a sufficient precision, and half-a-chip wide code phase bins. It makes 102350 time/frequency hypothesis. For the Galileo E1BC signal, the PN sequence is 4092 chips long. To reach the same accuracy and considering all other things being equal, four times more Doppler bins have to be explored. For a same processing power, the time required to perform a Galileo E1BC signal acquisition is therefore 16 times longer than for a GPS L1C/A signal. Similarly, at equal processing power, the time required to perform a GPS L1C signal acquisition is 100 higher than GPS L1C/A, while GPS L5 and Galileo E5a/E5b are 10 times longer.

In order to reduce the acquisition time, Assisted GNSS (A-GNSS) receivers use an auxiliary datalink, as for instance a GSM™, 3G, 4G or Wi-Fi™ datalink, to retrieve information about the GNSS system time, ephemerides, almanacs, and coarse information about the position of the receiver, as for instance the position of the base station transmitting, which is an approximation of the position of the receiver within a few hundred meters, therefore putting the receiver in a situation of warm start.

The Assisted GNSS receivers use this information to first reduce the acquisition time. Indeed, from the position of the satellites (through the ephemerides and/or almanac data) and the approximate position of the receiver, the receiver may select the PN sequences which are to be tracked, eliminating the PN sequences corresponding to satellites that have no chance to be in line of sight. The receiver may also reduce the size of the Doppler frequency grid tested, as this Doppler frequency comes from the relative movement between the satellites and receiver, which is mainly related to the movement of the satellite considered, provided in the almanac data.

In addition, as ephemerides are provided to the Assisted GNSS receiver, it is not necessary to extract those data from the navigation message, and the pseudo-range computation can be performed as soon as a subframe preamble is retrieved.

This way, assisted GNSS receivers are capable to quickly perform PVT measurements. However, it relies entirely on the availability of the auxiliary datalink.

Figure 3:
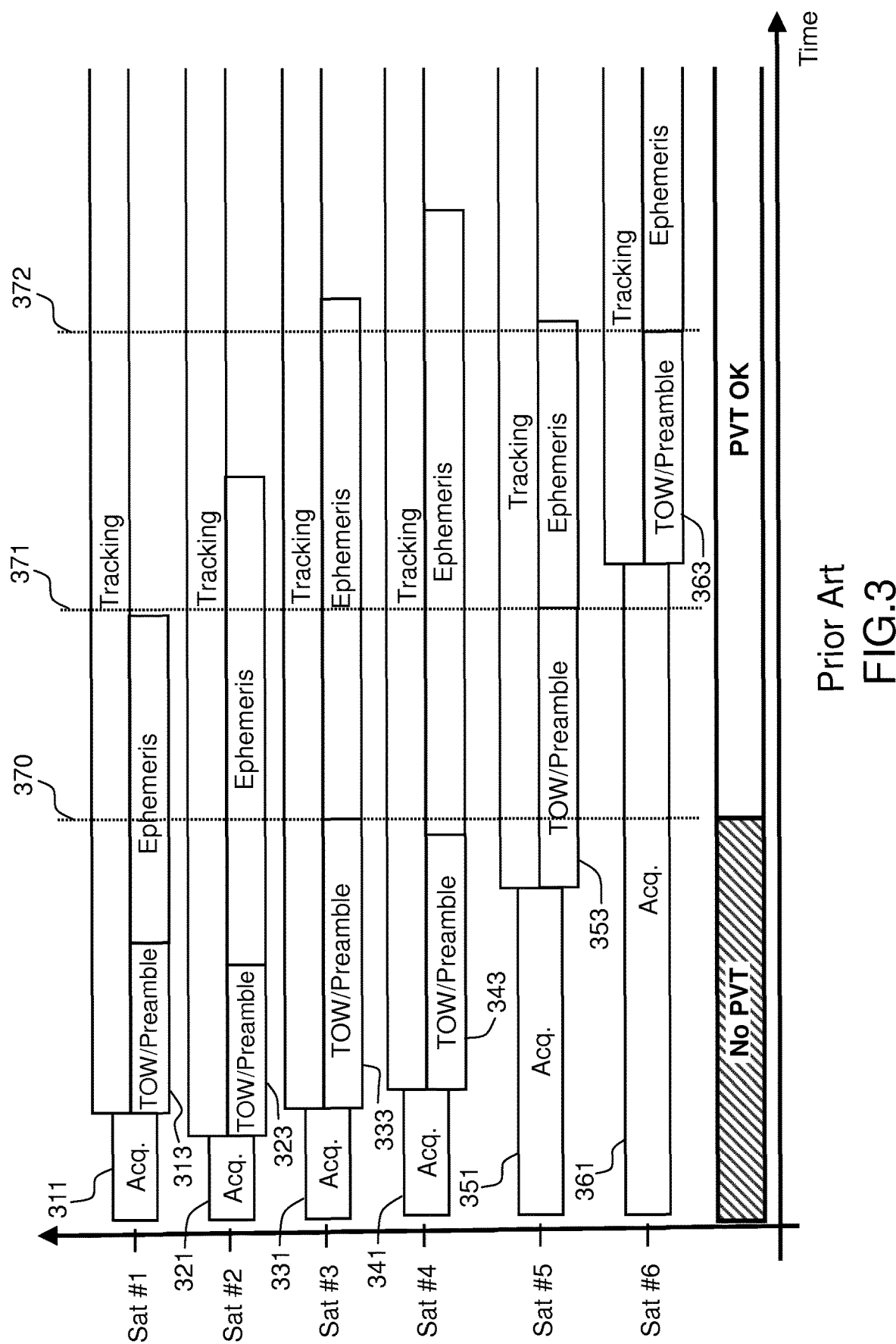
FIG. 3 illustrates a timeline for computing a PVT measurement in an Assisted GNSS receiver according to the prior art.

FIG. 3 illustrates a timeline for computing a PVT measurement in an Assisted GNSS receiver. As for all figures, FIG. 3 is given for illustration purposes only.

In FIG. 3, the time 311, 321, 331 and 341 required to acquire the signal for satellites #1, #2, #3 and #4 are made very short, due to the knowledge of the positions of the satellites, and as the acquisition may be limited to satellites which are known to be in line of sight. For the same reason, acquisition time 351 is reduced compared to conventional GNSS receivers. In addition, this time, acquisition 361 performed over satellite #6 is successful, as only satellites that are in line of sight of the receiver are considered.

In A-GNSS receiver, as the GNSS system time is provided by the auxiliary datalink, it is not mandatory to decode the TOW field. The receiver may deduce the transmission time of the message from the system time, the approximate distance with the satellite, and the detection of a preamble in a subframe. At time 370, pseudo-range measurements are available for satellites #1, #2, #3 and #4, as the TOW data/preamble (313, 323, 333, 343) are retrieved from the navigation messages/detected. A PVT measurement can therefore be computed using the ephemerides provided by the auxiliary datalink. This PVT measurement is improved in 371 as a fifth TOW (353) is retrieved, and further improved in 372 with the sixth TOW (363).

Typical acquisition time for an Assisted GNSS receiver is of about 6 seconds or less for GPS receivers, and about 1 second or less for Galileo E1BC receivers.

Figure 4:
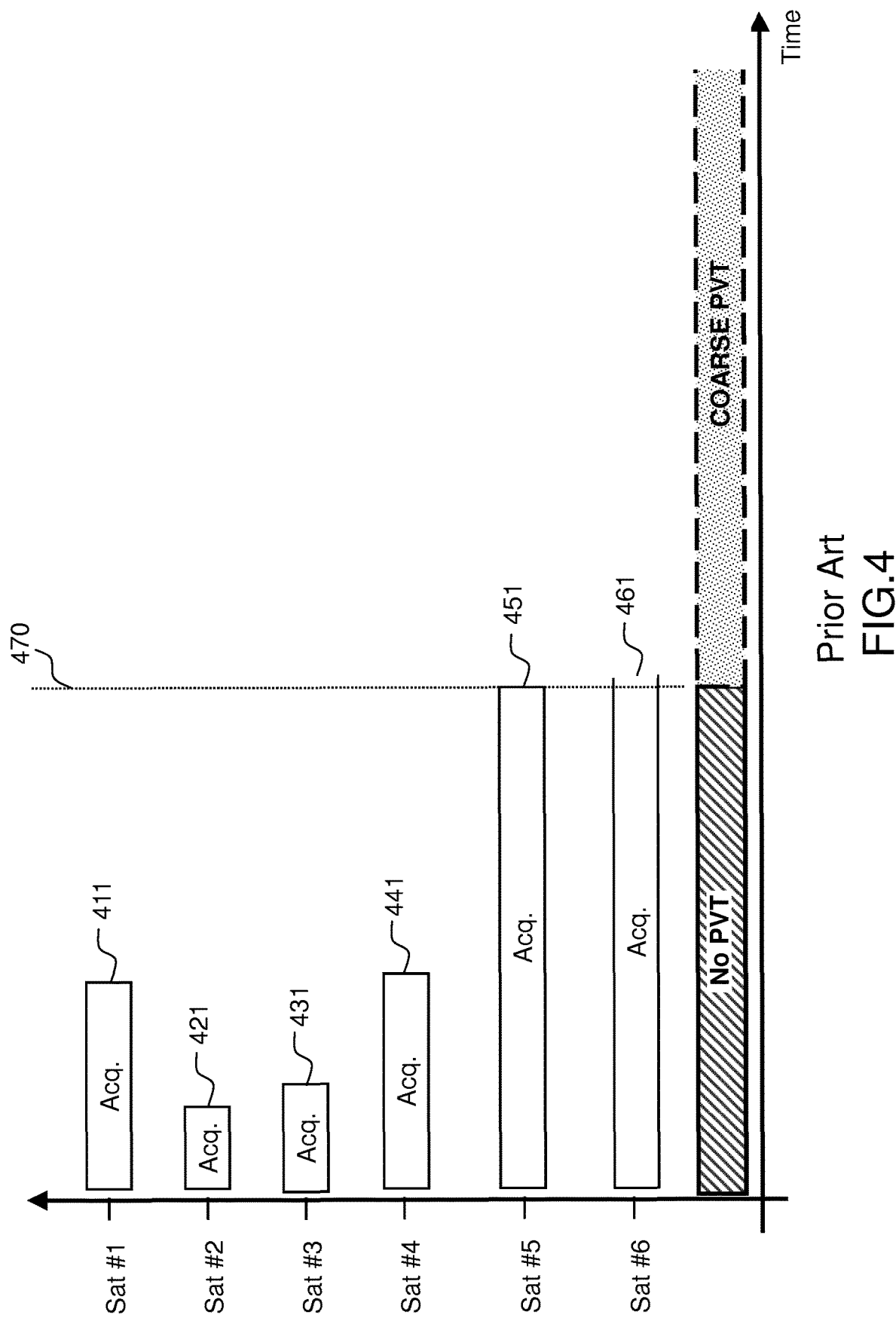
FIG. 4 illustrates a timeline for computing a snapshot PVT measurement in a receiver according to the prior art.

FIG. 4 illustrates a timeline for computing a snapshot PVT measurement in a receiver according to the prior art. FIG. 4 is given for illustration purposes only.

Snapshot receivers are capable to compute a PVT measurement very quickly (typically in less than one second), as they do not need the CED at all. However, computing a snapshot PVT requires some inputs: a coarse position, a coarse time, and a coarse position of the satellites (ephemerides).

The requirement concerning the accuracy of the coarse position is very low, as it can be in the range of ±1000 km.

The requirement concerning the accuracy of the coarse time information is also very low, as it can be of ±1 minute. Such accuracy can be provided during months by any mass market clock such as a low cost, low power, Real-Time Clock.

The requirement concerning the accuracy of the coarse ephemerides is also low. For instance, long term ephemeris can be used. Indeed, ephemeris data transmitted within the navigation messages of GNSS signals are very accurate. They are computed regularly (typically every four hours) using very accurate measurements performed by several ground stations. The accuracy required by snapshot receivers concerning the satellites' positions is not as high, as positioning errors of hundreds of meters can be handled. It is known, for instance from US patent application 2011/0234456 A1 or U.S. Pat. No. 7,548,200 B2, ephemeris data called "Long Term Ephemeris" (LTE) or "Extended Ephemeris", that contain the position of satellites for weeks, instead of hours. The accuracy of the LTE decreases gradually with the time elapsed from the moment they are calculated. However, it is sufficient to feed a snapshot receiver. Software solutions to generate LTE in a receiver are available on the market, as for instance from "28-Day Extended Ephemeris, Next Generation GNSS Satellite Orbit Prediction Technology", Baseband Technologies INC., Canada.

Alternately, almanacs data provide information about the satellites positions which are valid for almost 90 days, with a low accuracy that is however sufficient to perform a snapshot positioning.

Accuracy of the coarse time information, coarse receiver's position information and coarse satellites' positions information required to perform a snapshot positioning are very low, and might not be sufficient to perform a hot start, or even a warm start of the receiver according to the commonly used definitions.

In FIG. 4, acquisition phase (411, 421, 431, 44, 451 and 461) is performed over signals received from satellites #1 to #6. For illustration purposes, the time required to acquire the signals is equal to those of FIG. 2. The acquisition phase consists in searching, for specific PN code sequences, a peak into correlation products computed between the signal received on the antenna and locally generated signals, generated using said PN code sequence and the local time, for a range of code phase delays and Doppler frequencies, just like in the acquisition phase of FIGS. 2 and 3.

For each of these signals, a so-called pseudo-range residual measurement (or ambiguous pseudo-range) is calculated. Indeed, the navigation message comprising the TOW field is not decoded. The transmission delay between a specific satellite and the receiver can only be expressed as the sum of an integer number Ni of code phase delay periods, and a fractional number $\varphi_i$ of code phase delay periods. In snapshot receivers, the number Ni is not known. Therefore, only pseudo-range residual measurements, which are pseudo-range measurements with a remaining unknown Ni, can be calculated.

At time 470, five pseudo-range residuals are available to the snapshot receiver, which then calculates a PVT measurement solving a system of five equations with five unknowns: the 3D coordinates of the receiver (x, y, z), the bias τ between the GNSS system clock and the receiver clock, and Ni. The snapshot receiver then switches to standby mode, waiting for the next interrogation.

The snapshot positioning measurement is of low accuracy, but can be processed very quickly. However, this accuracy is sufficient for many applications, as for instance localising a boat at sea or tracking the movement of wild animals at the scale of an entire continent, and this solution has a very low power consumption.

One aspect of the solution disclosed is to implement a receiver performing both a snapshot positioning and a conventional GNSS positioning. The snapshot positioning is not only used to quickly provide a low accuracy positioning information, but also to feed the acquisition engine of the conventional GNSS positioning to increase the speed of subsequent signals acquisitions. Therefore, the processing power required to acquire subsequent signals is reduced, and the PVT measurement is more accurate quicker than in conventional GNSS receivers.

Figure 5:
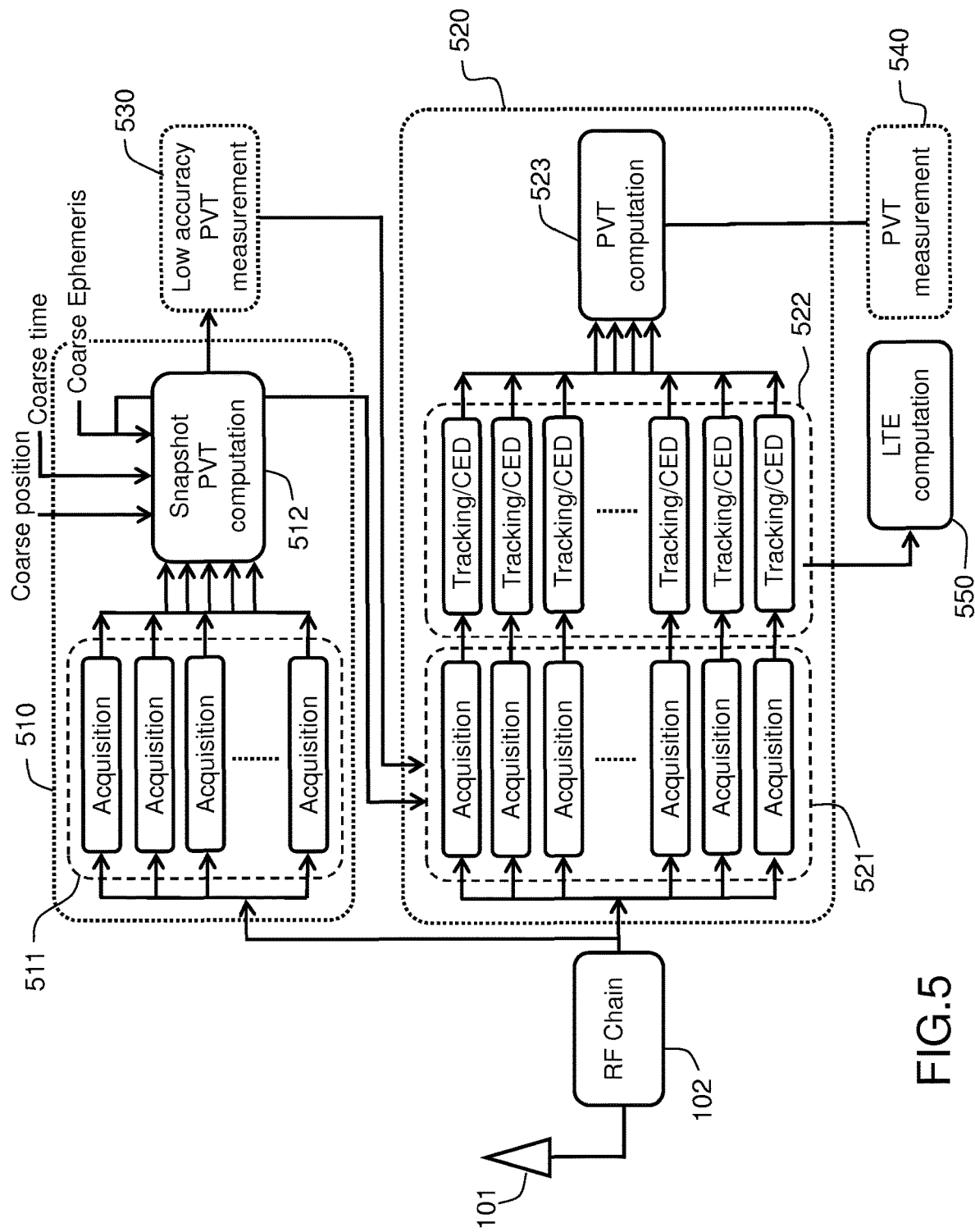
FIG. 5 represents the structure of a device according to one embodiment.

FIG. 5 represents the structure of a device according to one embodiment.

The device according to the disclosure may be a programmable circuit embedded in a GNSS receiver, or the GNSS receiver itself. The GNSS receiver object of this embodiment or the GNSS receiver that embed a device according to this embodiment comprises an antenna 101 and an RF chain 102 to receive, down-convert, filter, process and digitize the signals received from the GNSS satellites.

As for snapshot receivers, the device according to this embodiment takes as inputs coarse information about its position, the actual time and ephemerides relating to the position of the satellites of the constellation.

The coarse position may be obtained, for instance, by a user interface where the user has to select its approximate position, its country or its city. Alternatively, it can be obtained using GNSS Doppler positioning instead of GNSS pseudo-range positioning.

GNSS Doppler positioning techniques are ancestors of the GNSS positioning techniques based on pseudo-range measurements. They were used to estimate a receiver position with a coarse accuracy (a few kilometers), which decreases along with the receiver's speed. They do not require any a priori information about the receiver position, do not require the decoding of a navigation message, and their accuracy is sufficient to perform a snapshot PVT measurement. The US TRANSIT navigation system is an example of such a system.

Doppler positioning consists in performing an acquisition over at least four GNSS signals of any type, and retrieving the value of the Doppler frequency shift associated to each of these signals. Knowing the positions and directions of the satellites from the ephemerides, receivers can determine a cone which extremity is the position of the satellite, and which circumference of the base corresponds to points of constant Doppler frequency. By triangulation, solving a system of four equations and four unknown variables, a coarse PVT measurement (coarse 3-D position and coarse clock drift) can be determined. Determining a position using Doppler positioning is detailed for instance into "Combined Doppler Time-free Positioning for Low Dynamics GNSS Receivers", Nicholas Bernard Otieno Othieno, Thesis in the Department of Electrical and Computer Engineering, Concordia University Montreal, Quebec, Canada, April 2012.

The coarse ephemerides may be provided using LTE (Long Term Ephemeris) or similar techniques, which have a lifetime of several weeks.

The device according to this embodiment comprises both resources 510 required to compute a snapshot positioning and resources 520 required to compute a conventional positioning over the digitized signal.

The snapshot positioning 510 quickly provides a low accuracy PVT measurement 530, that is to say low accuracy (x, y and z) coordinates, a low accuracy system time, and a low accuracy velocity. This low accuracy PVT measurement is available to the receiver as soon as the calculation device has achieved computing pseudo-range residual measurements from five satellites. It can theoretically be computed after only one integration time, that is to say typically after 1 to 20 ms for GPS L1C/A. However, in real operating conditions, the acquisition may be averaged over longer periods, to reduce dispersion and increase the SNR. Nonetheless, a snapshot PVT measurement can typically be achieved in less than one second.

To this end, it comprises an acquisition engine 511, which performs correlations between the digitized GNSS signals and locally generated replicas of the GNSS signals over a grid of possible code phase delay/Doppler frequency shifts, in order to determine a code phase delay and a Doppler frequency shift. The correlations are made considering separately the GNSS signals received based on their PN sequence, in order to determine a code phase delay and a Doppler frequency shift that is proper to the satellite considered. From this information, pseudo-range residual measurements are computed using a coarse position, coarse time and coarse ephemerides available to the receiver. When five or more pseudo-ranges residual measurements are computed, a snapshot PVT computation 512 is processed, to determine a low accuracy PVT measurement 530.

The snapshot resources 510 may then switch to standby mode, waiting for the next interrogation without tracking the synchronisation position of the GNSS signals acquired.

Resources 520 performing the conventional positioning measurement comprise an acquisition engine 521 and a tracking engine 522. The tracking phase aims at following the synchronization position determined in the acquisition step to retrieve the Clock and Ephemeris Data (at least TOW and Ephemeris fields) comprised into the navigation messages carried by the GNSS signals. Using this information, pseudo-ranges are calculated as in conventional receivers, which are used for a PVT computation 523, to deliver a fine PVT measurement 540.

As soon as the low accuracy position and velocity information 530 are made available from the snapshot positioning, they are used along with the coarse ephemerides to reduce the size of the Doppler shift grids that are explored by the acquisition engine 521 for signals which have not been acquired yet. Therefore, the length of the acquisition phase for these signals is reduced. In addition, using the coarse ephemerides and the low accuracy position of the receiver, the acquisition engine can dedicate its resources to prioritize acquisitions over signals broadcasted by satellites which are known to be in line of sight.

For instance, as in GPS L1C/A, instead of searching for GNSS signals into a grid of 50 Doppler bins to cover the interval ±5 kHz of Doppler frequency shift, the new interval explored could be of ±75 Hz around a Doppler frequency shift value determined from the position of the receiver and the velocity of the receiver provided by the snapshot PVT measurement (to which a standard receiver clock drift value might be added since it also contributes to the Doppler shift perceived by the receiver), and the position of the satellites, provided by the coarse ephemerides (LTE or almanacs). The interval of Doppler frequency shift explored by acquisition engine 521 may be reduced, for instance, to three or five Doppler bins positioned around the Doppler frequency value computed, while reaching the same accuracy as in conventional acquisition. The processing power required to compute the correlation is therefore divided by more than 16 in the first case, the acquisition engine being thus capable to perform signal acquisition over 16 GNSS signals in parallel instead of one, reducing thus the time required to acquire new signals and/or the processing power required for signals acquisition.

Similarly, when the low accuracy position and time information 530 are made available from the snapshot positioning, they may be used along with the coarse ephemerides to advantageously reduce the size of the code phase delays that are explored by the acquisition engine 521 for signals which have not been acquired yet. This advantageously reduces the processing power consumed the acquisition phase, but, as the periods of codes are limited to some milliseconds, requires that the coarse information about the position of the satellites and the position and time information provided by the snapshot positioning, are sufficiently accurate.

Once four pseudo-ranges measurements have been computed by the conventional positioning algorithm, meaning that the CED data have been received, a conventional PVT measurement can be computed, which is improved by each additional pseudo-range measurement.

The snapshot PVT measurement 530 is very likely to be made available while tracking 522 of the GNSS signals previously acquired is in process within the calculation device 520, that is to say before the computation of a conventional PVT measurement 523. Therefore, using the information provided by the snapshot PVT measurement, acquisition of new GNSS signals will be faster.

Depending on the propagation conditions, the navigation messages of the newly acquired GNSS signals may be decoded prior to the ones of the signals previously acquired. In that case, the TTFF required to deliver a conventional PVT measurement 523 will be reduced with respect to the prior art.

Even if not decoded first, the decoding of the navigation messages of the newly acquired GNSS signals will advantageously be performed in advance compared to the prior art, and the PVT measurement will reach acceptable high accuracy quicker than in the prior art.

Advantageously, when the coarse ephemerides are provided by LTE, the device according to the disclosure may compute new LTE 550, to update the LTE used as inputs of the snapshot positioning algorithm in further measurements. Indeed, as the quality of the LTE decrease over time, by refreshing it using the ephemeris and navigation data acquired from the navigation messages, the time during which the device can operate in standalone is extended. The GNSS receiver can be totally standalone by performing one conventional PVT measurement per LTE lifetime. Considering the validity period of the LTE, the pace for refreshing the LTE may be chosen as of several hours, or even several days or weeks.

When the coarse ephemerides are obtained considering the almanacs data, the almanacs memorized and used to perform the snapshot PVT, may be refreshed as soon as new almanacs have been determined from the navigation messages.

Advantageously, when the conventional PVT measurement 523 is computed, the values of the fine position and velocity of the receiver are used, instead of those of the snapshot PVT measurement 530, to reduce the grid of possible Doppler frequency shift. Indeed, these measurements are of a better accuracy than those of the snapshot computation.

In the embodiment of FIG. 5, the calculation device 510 used to perform the snapshot positioning and the calculation device 520 used to perform the conventional positioning, as well as the LTE computation 550 if relevant, may be implemented as separate algorithms in a single calculation machine such as a software reprogrammable calculation machine (microprocessor, microcontroller, digital signal processor (DSP), . . . ), a dedicated calculation machine (Field Programmable Gate Array (FPGA), Application Specific Integrated Circuit (ASIC), . . . ), or any other appropriate mean. Alternatively, they may be implemented over separate calculation machines, or separate chips, associated, linked and/or connected to one another.

Figure 6:
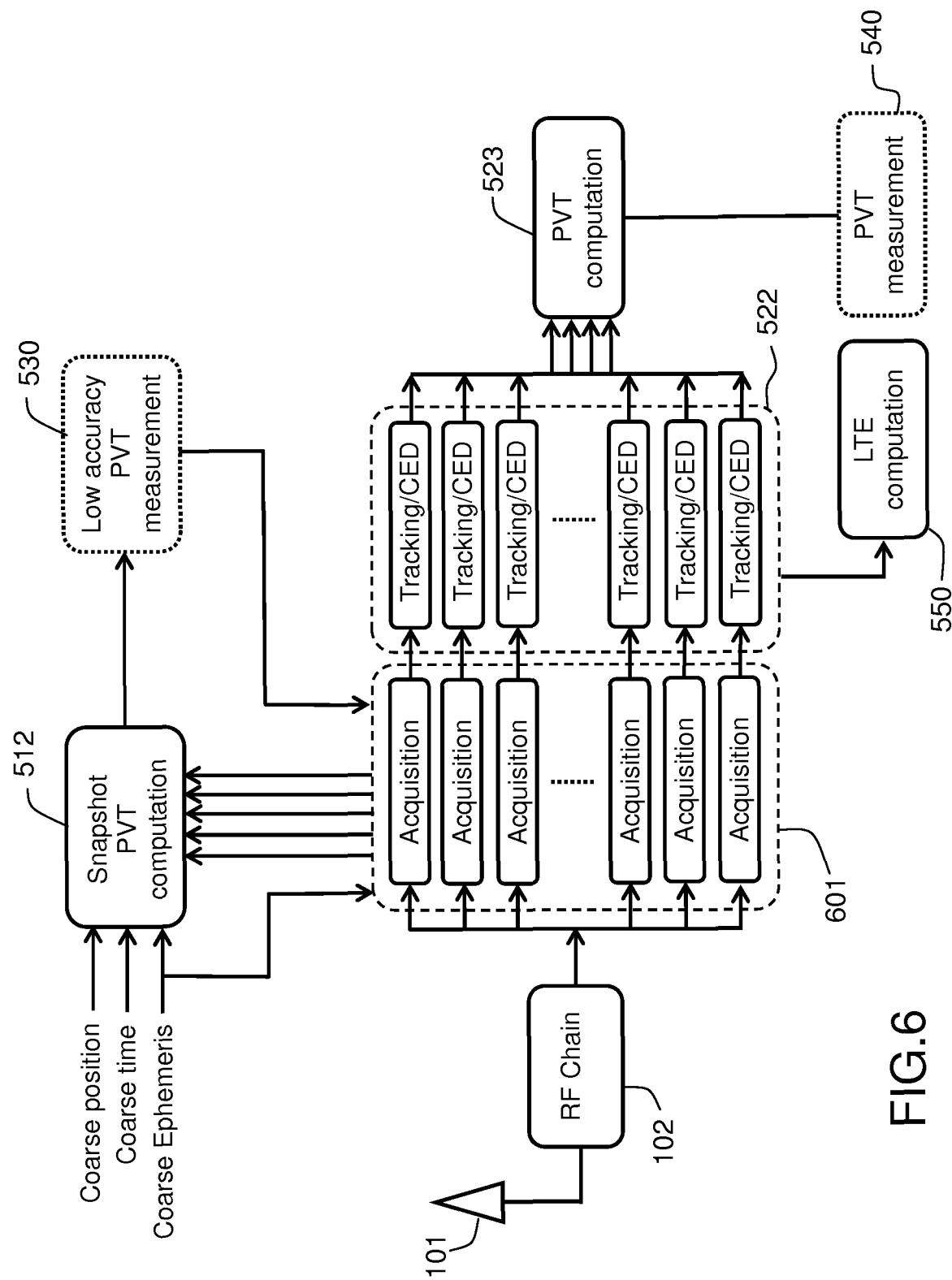
FIG. 6 represents the structure of a device according to another embodiment.

FIG. 6 represents the structure of a device according to another embodiment.

This embodiment differs from the one of FIG. 5 in that a common acquisition engine 601 is used to process the snapshot positioning and the conventional positioning. The signal acquisition 601 is performed as in conventional receivers. When a processing channel achieves acquisition of a GNSS signal, the tracking engine 522 follows this synchronisation position to retrieve the CED. Once the signal is acquired from five GNSS signals, pseudo-range residuals measurements are computed and used along with a coarse position of the receiver, a coarse time information and coarse ephemerides to compute (512) a low accuracy snapshot PVT measurement 530. The information about the position of the receiver and its velocity retrieved from the snapshot PVT measurement 530 are then used along with the coarse ephemerides data to reduce the size of the Doppler shift grid explored to perform the subsequent acquisitions 601, and in some embodiments the size of the code phase delay explored. Once CED data 522 are retrieved for at least four satellites, a conventional PVT measurement 523 is performed, to calculate a fine PVT measurement. When appropriate, LTE 550 may be calculated.

In this embodiment, the resources performing the acquisition of the GNSS signals are shared between the snapshot and the conventional PVT measurement. The various components (acquisition engine 601, tracking engine 522, snapshot PVT computation 512, conventional PVT computation 522, and LTE computation 550) may be implemented over a single calculation device, or over multiple calculation devices. For instance, the snapshot PVT computation 512 and the conventional PVT computation 523 may be performed by a same calculation circuit or by distinct calculation circuits. In terms of costs (size of the component, processing power required), this second implementation is advantageous as it only needs implementing one acquisition engine 521.

Figure 7:
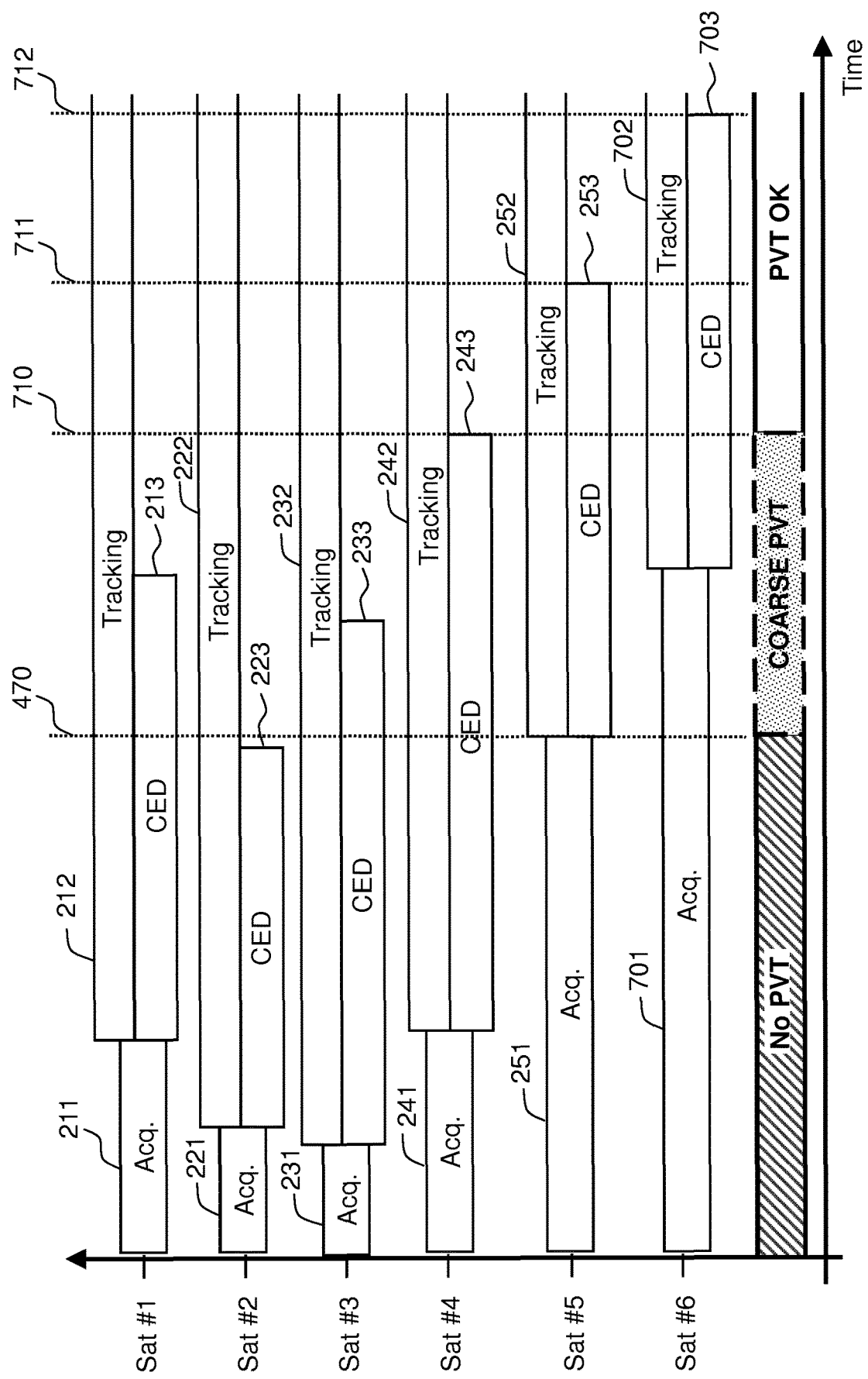
FIG. 7 illustrates a timeline for computing a PVT measurement in a device according to one embodiment.

FIG. 7 illustrates a timeline for computing a PVT measurement in a device according to one embodiment. As for other figures, it is given for illustration purposes only.

In the illustrative example, when turned on, the receiver starts the acquisition phase over 6 satellites, using the same assumptions as for FIGS. 2, 3 and 4. The acquisition phases 211, 221, 231 and 241 succeed quickly for satellites #1, #2, #3 and #4. They are followed by tracking 212, 222, 232 and 242 of the GNSS signals, in order to retriever CED 213, 223, 233 and 243. The acquisition phase 251 takes more time for satellite #5, but is achieved at time 470. Therefore, the phases of tracking the synchronisation position 252 and retrieving the CED 253 start at time 470 for satellite #5.

At time 470, only one CED is retrieved (223). Only one pseudo-range can be calculated, which is not sufficient to compute a conventional PVT measurement. However, five pseudo-range residual measurements are available, which makes possible to compute a snapshot PVT measurement. At time 470, the device according to the disclosure can thus advantageously deliver a first, low accurate, PVT information.

Using the position and velocity information calculated from the snapshot positioning, in combination with the LTE, it is possible to reduce the grid of Doppler shift explored concerning satellite #6, and depending on the embodiment, the grid of code phase delays explored. Using the position information and the coarse ephemerides, it is also possible to determine which satellites are supposed to be in line of sight, and to focus acquisition of new signals over signals transmitted from those satellites.

Therefore, the duration of the acquisition phase 701 concerning satellite #6 is advantageously reduced when compared to conventional GNSS receivers.

At time 710, CED 213, 223, 233 and 243 are made available from satellites #1, #2, #3 and #4. The GNSS receiver is therefore capable to compute four pseudo-range measurements to calculate a conventional PVT measurement.

At time 711, CED 253 retrieved from satellite #5 are available, which makes possible to compute an additional pseudo-range to improve the accuracy of the conventional PVT measurement.

At time 712, contrary to the illustrative example of FIG. 2, CED 703 retrieved from satellite #6 are available, which makes possible to further improve the accuracy of the conventional PVT measurement.

Practically, the improvement of the device according to the solution disclosed are therefore the following with respect to conventional GNSS receivers:
- at time 470, a coarse PVT measurement is provided with a raw accuracy, and
- at time 712, the conventional PVT measurement is available with a higher accuracy than in state of the art receivers.

All these advantages can be obtained for a standalone receiver, as soon as it has coarse information about its position (typically ±1000 km), coarse time (typically ±1 minute), and coarse ephemeris (typically obtained from LTE or equivalent data, or from almanacs).

Another advantage comes from the fact that, when the decoding of the navigation message does not succeed during the tracking phase intended over the first five signals acquired, acquisition of subsequent signals is accelerated by the disclosure compared to the prior art, and these signals may be easier to decode than the previous ones.

In the illustrative example given in FIG. 7, the time required to compute a conventional PVT measurement 710 is the same as the one required in a conventional receiver as illustrated in FIG. 2. However, when the tracking of the signal or the retrieval of the CED is difficult, as for instance when strong multipath occur, or when the SNR levels are very low, this time can be significantly reduced thanks to the disclosure, as for a constant processing power, more GNSS signals can be acquired. In addition, in such cases, instead of having no information about its position until four CED are retrieved, the device according to the solution disclosed quickly provides a low accuracy PVT measurement, provided by the snapshot positioning.

The disclosed solution also has the advantage that it may be implemented in existing GNSS receivers through a firmware update only, as the embodiment of FIG. 6 uses the existing RF chain 102 and acquisition engine 601 to feed an algorithm of snapshot positioning. Existing GNSS receivers can therefore be retrofitted to benefit from the advantages of the object of the disclosure. New GNSS receivers may directly implement the solution disclosed without any additional cost for hardware.

The solution can be implemented in standalone receivers, and do not have to rely on any additional connectivity or to a specific GNSS system.

In a GNSS receiver, the acquisition phase is the one that uses the most processing power. The disclosure advantageously helps reducing the duration of this acquisition phase, which saves battery power.

In all the embodiments presented above, the assumption was taken that a complete PVT measurement has to be computed. Obviously, when the number of unknown decreases, the number of unknown to resolve in the navigation equations decreases in proportion. For instance, if the coordinate z relating to an altitude is made available to the device, as for instance using an altimeter, the number of pseudo-range measurements required to compute a conventional PVT measurement is of three instead of four, while only four pseudo-range residual measurements instead of five are required to compute a snapshot PVT measurement.

Similarly, the assumption has been taken that GNSS transmitters are satellites, but the solution disclosed applies the exact same way when the transmitters are not, as for instance if the GNSS signals are transmitted from ground stations, or specific equipment like pseudolites or repeaters.

Figure 8:
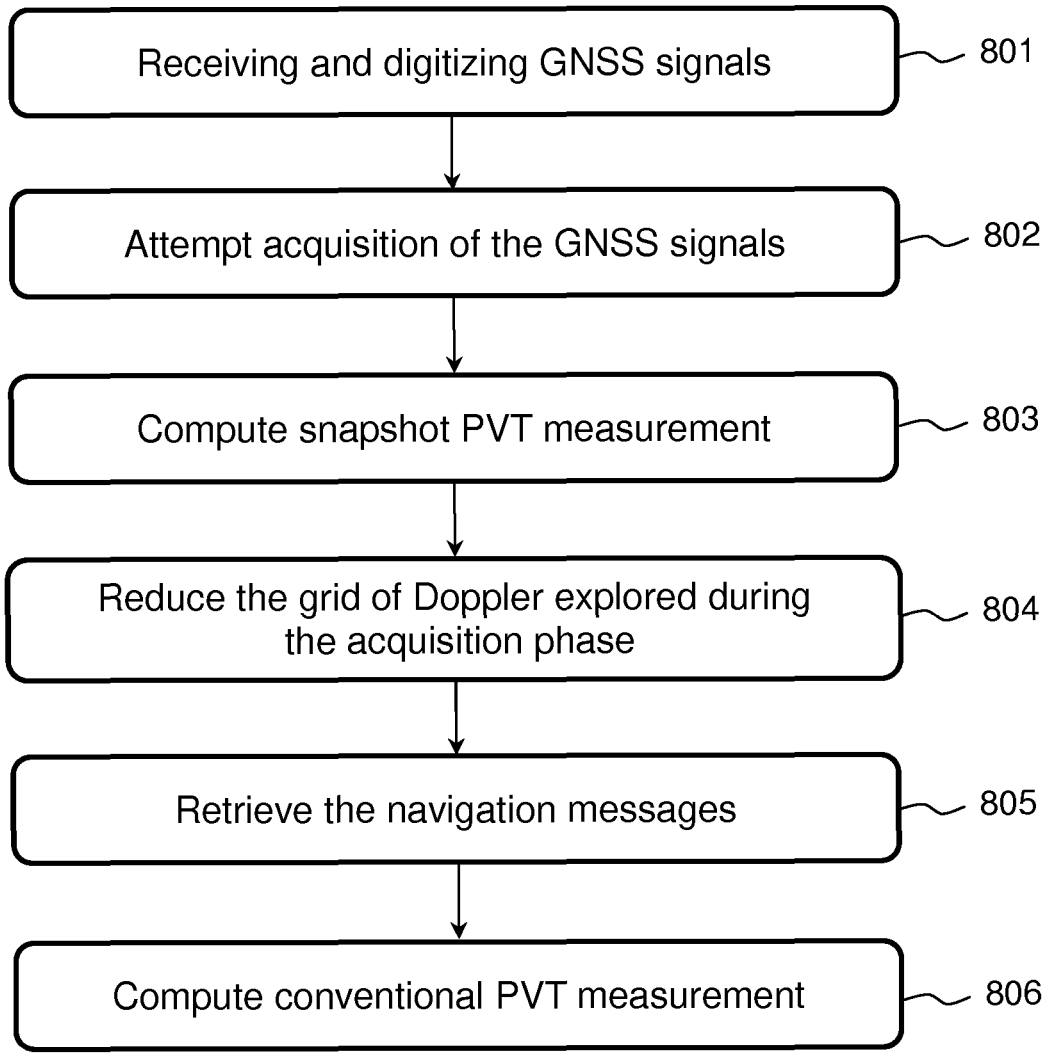
FIG. 8 illustrates an embodiment of a method according to the solution as disclosed.

The disclosure further concerns a method, to determine a first, fine and accurate, PVT measurement in a GNSS receiver from signals broadcasted by a plurality of transmitters, as for instance GNSS satellites, ground base stations, repealites or pseudolites. One embodiment of this method is illustrated by FIG. 8. It comprises the following steps:
- receiving and digitizing (801) the GNSS signals through an antenna and a RF chain;
- determining a code phase delay and a Doppler frequency shift associated to at least some of the GNSS signals received (802) by exploring, for the GNSS signals considered, a grid of possible code phase delays and Doppler frequency shift values. This step is known as the acquisition phase. A couple of code phase delay and Doppler frequency shift is determined for each GNSS signal for which acquisition has succeeded;
- computing at least a second position and a second velocity measurement (803) from code phase delays determined in the acquisition stage, a coarse position of the receiver, a coarse time and coarse ephemerides. From the code phase delays, pseudo-range residual measurements are calculated, which are pseudo-range measurements where an unknown factor (the number Ni of integer code phase periods taking place during the propagation of the signal) remains. As soon as five pseudo-range residual measurements are available, a low accuracy PVT measurement may be processed considering a snapshot computation. This step is to be performed at least once at the receiver start;
- using the second position, the second velocity and the coarse ephemerides to reduce the size of the grid of possible Doppler frequency shift values explored during the acquisition phase (804) of all subsequent satellites; and
- retrieving clock and ephemeris data (805) from navigation messages comprised into the GNSS signals. To this end, the synchronisation position shall be tracked, in order to follow the respective movements of the satellites and receiver. This step is known as tracking and retrieving of the clock and ephemeris data (CED);
- computing the first PVT measurement (806) from code phase delays determined during the acquisition phase and the clock and ephemeris data retrieved in the tracking phase. To this end, pseudo-ranges measurements are computed for each satellite when the CED have been retrieved. When at least four pseudo-range measurements are computed, a conventional PVT computation is performed. This step is realized continuously, to update the position of the receiver, as long as at least four pseudo-ranges are available.

Advantageously, when the first, conventional, PVT measurement is achieved, the position and velocity measurements of the first PVT measurement may be used to reduce the grid of possible Doppler frequency shift values explored during the acquisition phase instead of the position and velocity provided by the snapshot computation, instead of the second position and second velocity measurements.

While embodiments have been illustrated by a description of various examples, and while these embodiments have been described in considerable details, it is not the intent of the applicant to restrict or in any way limit the scope of the appended claims to such details. The disclosure in its broader aspects is therefore not limited to the specific details, representative methods, and illustrative examples shown and described.

The invention claimed is:

1. A device configured to calculate a first Position, Velocity and Time (PVT) measurement from Global Navigation Satellite System (GNSS) signals broadcasted by a plurality of transmitters of a GNSS constellation, the device comprising:
   at least a first acquisition engine, configured to determine a code phase delay and a Doppler frequency shift value from a plurality of digitized GNSS signals respectively, by exploring a grid of possible code phase delays and Doppler frequency shift values for each digitized GNSS signal considered,
   a tracking engine configured to retrieve clock and ephemeris data from navigation messages comprised into the digitized GNSS signals,
   a first calculation device configured to compute said first PVT measurement from code phase delays determined by the first acquisition engine and clock and ephemeris data retrieved by the tracking engine for the corresponding GNSS signals, and
   a second calculation device configured to compute a second PVT measurement from code phase delays determined by an acquisition engine, a coarse position of the receiver, a coarse time and coarse ephemerides, wherein the second calculation device performs the second PVT measurement through a snapshot PVT calculation, and wherein the device is configured to adapt the size of the grid of possible code phase delays and Doppler frequency shift values explored by the first acquisition engine using the value of the second PVT measurement computed by the second calculation device.

2. The device of claim 1, wherein the position and the velocity of the second PVT measurement are used along with the coarse ephemerides to reduce the number of Doppler frequency shift values of the grid explored by the first acquisition engine.

3. The device of claim 1, wherein the position and the time of the second PVT measurement are used along with the coarse ephemerides to reduce the number of code phase delays values of the grid explored by the first acquisition engine.

4. The device of claim 1, wherein the first acquisition engine is configured to perform correlations between the digitized GNSS signals and local replicas of said GNSS signals generated considering code phase delays and Doppler frequency shift values from said grid of possible code phase delays and Doppler frequency shift values.

5. The device of claim 1, further configured to use the second PVT measurement and the coarse ephemerides to select the GNSS signals considered in priority by the first acquisition engine.

6. The device of claim 1, wherein the device is configured to further adapt the size of the grid of possible code phase delays and Doppler frequency shift values explored by the first acquisition engine using the value of the first PVT measurement computed by the first calculation device.

7. The device of claim 1, wherein the tracking engine tracks the variations of code phase delay and Doppler frequency shift determined by the first acquisition engine.

8. The device of claim 1, wherein the first calculation device is configured to compute pseudo-range measurements from code phase delays determined by the first acquisition engine and the clock and ephemeris data retrieved by the tracking engine from the corresponding signals, and to use said pseudo-range measurements to compute said first PVT measurement.

9. The device of claim 1, wherein the second calculation device is configured to compute pseudo-range residual measurements from at least four code phase delays.

10. The device of claim 1, wherein the coarse position of the receiver used by the second calculation device is calculated through a Doppler positioning.

11. The device of claim 1, wherein the coarse ephemerides are Long Term Ephemeris.

12. The device of claim 11, further comprising a calculation device configured to compute Long Term Ephemeris from the clock and ephemeris data retrieved by the tracking engine.

13. A Global Navigation Satellite System (GNSS) receiver, comprising:
   an antenna and a Radio Frequency (RF) chain to receive and digitize GNSS signals, and a device according to claim 1.

14. A method for calculating a first Position Velocity and Time (PVT) measurement in a device from Global Navigation Satellite System (GNSS) signals broadcasted by a plurality of transmitters of a GNSS constellation, the method comprising the steps of:
   a. receiving and digitizing said GNSS signals through an antenna and a Radio Frequency (RF) chain,
   b. determining a code phase delay and a Doppler frequency shift value associated to the digitized GNSS signals received respectively by exploring a grid of possible code phase delays and Doppler frequency shift values,
   c. computing a second PVT measurement from code phase delays determined in step b, a coarse position of the receiver, a coarse time and coarse ephemerides through a snapshot PVT calculation,
   d. using the second PVT measurement to adapt the size of the grid of possible code phase delays and Doppler frequency shift values explored in step b,
   e. retrieving clock and ephemeris data from navigation messages comprised into the GNSS signals, and
   f. computing said first PVT measurement from the code phase delays determined in step b, and the clock and ephemeris data retrieved in step e.

* * * * *